US012717702B2

(12) United States Patent
Awasthi et al.

(10) Patent No.: US 12,717,702 B2
(45) Date of Patent: Aug. 25, 2026

(54) SYSTEMS AND METHODS FOR ERROR MITIGATION IN A SOFTWARE PIPELINE

(71) Applicant: Capital One Services, LLC, McLean, VA (US)

(72) Inventors: Ateet Kumar Awasthi, McKinney, TX (US); Chris Fields, Roanoke, TX (US); Saral Jain, Mckinney, TX (US); Matt Howarth, Garland, TX (US)

(73) Assignee: Capital One Services, LLC, McLean, VA (US)

( * ) Notice: Subject to any disclaimer, the term of this patent is extended or adjusted under 35 U.S.C. 154(b) by 281 days.

(21) Appl. No.: 18/422,093

(22) Filed: Jan. 25, 2024

(65) Prior Publication Data

US 2025/0245129 A1 Jul. 31, 2025

(51) Int. Cl.
*G06F 11/3668* (2025.01)
*G06F 8/71* (2018.01)

(52) U.S. Cl.
CPC .............. *G06F 11/368* (2013.01); *G06F 8/71* (2013.01); *G06F 11/3688* (2013.01)

(58) Field of Classification Search
CPC ....... G06F 8/71; G06F 11/368; G06F 11/3688
See application file for complete search history.

(56) References Cited

U.S. PATENT DOCUMENTS 9,928,059 B1 * 3/2018 Sartor ........................ G06F 8/71
10,146,524 B1 * 12/2018 Killmon .................... G06F 8/65
10,817,283 B1 * 10/2020 Naik ................... G06F 11/3612
11,366,713 B2 * 6/2022 Honnappa ........... G06F 11/3636
11,500,763 B1 * 11/2022 Petrescu ............. G06F 11/3692
12,158,831 B2 * 12/2024 Wan ...................... G06F 11/302
2015/0339213 A1 * 11/2015 Lee ..................... G06F 3/04842
717/125
2019/0243742 A1 * 8/2019 Natari ................. G06F 11/3608
2019/0266076 A1 * 8/2019 Maliani ............... G06F 11/3684
2019/0294528 A1 * 9/2019 Avisror ............... G06F 11/3698
2020/0278920 A1 * 9/2020 Khakare ................... G06F 8/61
2020/0278921 A1 * 9/2020 Stijohann ............ G06F 11/3698
2023/0246845 A1 * 8/2023 Peddada ............... H04L 9/3247
713/176
2024/0289261 A1 * 8/2024 Walker ................ G06F 11/3688
2024/0403199 A1 * 12/2024 Eizenman ................. G06F 8/75

* cited by examiner

*Primary Examiner* — Douglas M Slachta
(74) *Attorney, Agent, or Firm* — Foley & Lardner LLP

(57) ABSTRACT

Systems and methods for error mitigation in a software pipeline. In some aspects, the system receives a request for evaluating a pipeline at a recurrent interval of time. The request comprises a first version of software, a second version of software, evaluation tests to execute on the second version of the software at intermittent intervals, and the recurrent interval of time. The system, in response to determining the recurrent interval of time elapsed, executes the evaluation tests on the second version of the software. The system determines that the output of the evaluation tests does not match one or more target values. The system terminates deployment of the second version of the software. The system generates instructions to replace the second version of the software with the first version of the software and transmits a notification to a remote device.

20 Claims, 4 Drawing Sheets

200

SYSTEMS AND METHODS FOR ERROR MITIGATION IN A SOFTWARE PIPELINE

SUMMARY

Detecting anomalous application programming interface (API) releases is vital for several reasons. Anomalies, such as unexpected behavior or deviations from established patterns, can signal potential issues like software bugs, security vulnerabilities, or performance degradation. Timely identification of these anomalies is crucial to prevent widespread system disruptions and ensure a seamless user experience.

Conventional systems that lack an automated framework exacerbate the challenge of maintaining high uptime. Manual monitoring processes are susceptible to human error, slower response times, and limitations in providing real-time insights. An automated framework streamlines the monitoring process by continuously tracking API releases, enabling quick identification of irregularities, and facilitating rapid responses to mitigate potential problems. This proactive approach not only minimizes downtime but also enhances overall system stability. Automated frameworks offer the advantage of immediate detection and response, reducing the impact of anomalies on users. This, in turn, contributes significantly to maintaining a positive user experience and upholding the integrity of the system.

Accordingly, systems and methods are described herein for identifying anomalies and errors in a software development pipeline in real-time by performing analysis on the software development pipeline and reverting to an error-free version previously in production and verifying, through further analysis, that the reverted version is error-free. The described systems and methods provide a systematic and efficient means of monitoring, early anomaly detection, and swift response, ultimately contributing to the sustained high uptime and functionality of a system.

Methods and systems are described herein for novel uses and/or improvements to detecting and reverting errors in a software development pipeline without introducing additional errors. The system performs a three-pronged transaction analysis using evaluation tests and error detection in a software development pipeline where the three prongs are regular interval checks, a pre-revert check, and a post-revert check.

In some aspects, a method for real-time error mitigation in a software pipeline includes receiving, from a server, a request for evaluating a software pipeline at a recurrent interval of time. The request comprises a previous version of software, a current version of software, and the recurrent interval of time. The method further includes determining one or more evaluation tests to execute on the current version of the software at intermittent intervals. The method further includes, in response to determining the recurrent interval of time elapsed, executing the one or more evaluation tests, by performing the one or more evaluation tests on the current version of the software. The method further includes receiving an output of the one or more evaluation tests on the current version of the software. The method further includes determining the output of the one or more evaluation tests does not match one or more target values. The method further includes terminating deployment of the current version of the software. The method further includes generating instructions to replace the current version of the software with the previous version of the software. The method further includes transmitting a notification to a remote device indicating a real-time mitigation action has occurred.

In some embodiments, the method includes replacing the current version of the software with the previous version of the software based on the instructions by removing code associated with the current version of the software from the software pipeline, generating a new version of the software based on the previous version of the software, and adding the new version of the software to the software pipeline.

In some embodiments, the method further includes performing a check after adding code associated with the previous version of the software to the software pipeline by receiving a second output of the one or more evaluation tests on the new version of the software, determining the second output of the one or more evaluation tests does not match the one or more target values associated with the new version of the software, and transmitting a second notification to the remote device indicating the real-time error mitigation action was unsuccessful. The method further includes, in response to determining that the second output of the one or more evaluation tests does not match the one or more target values associated with the replacement version of the software, terminating deployment of the replacement version of the software, generating instructions to revert from the replacement version of the software to the current version of the software, and transmitting a third notification to the remote device indicating the real-time error mitigation action has been reversed.

Various other aspects, features, and advantages of the disclosure will be apparent through the detailed description and the drawings attached hereto. It is also to be understood that both the foregoing general description and the following detailed description are examples and are not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
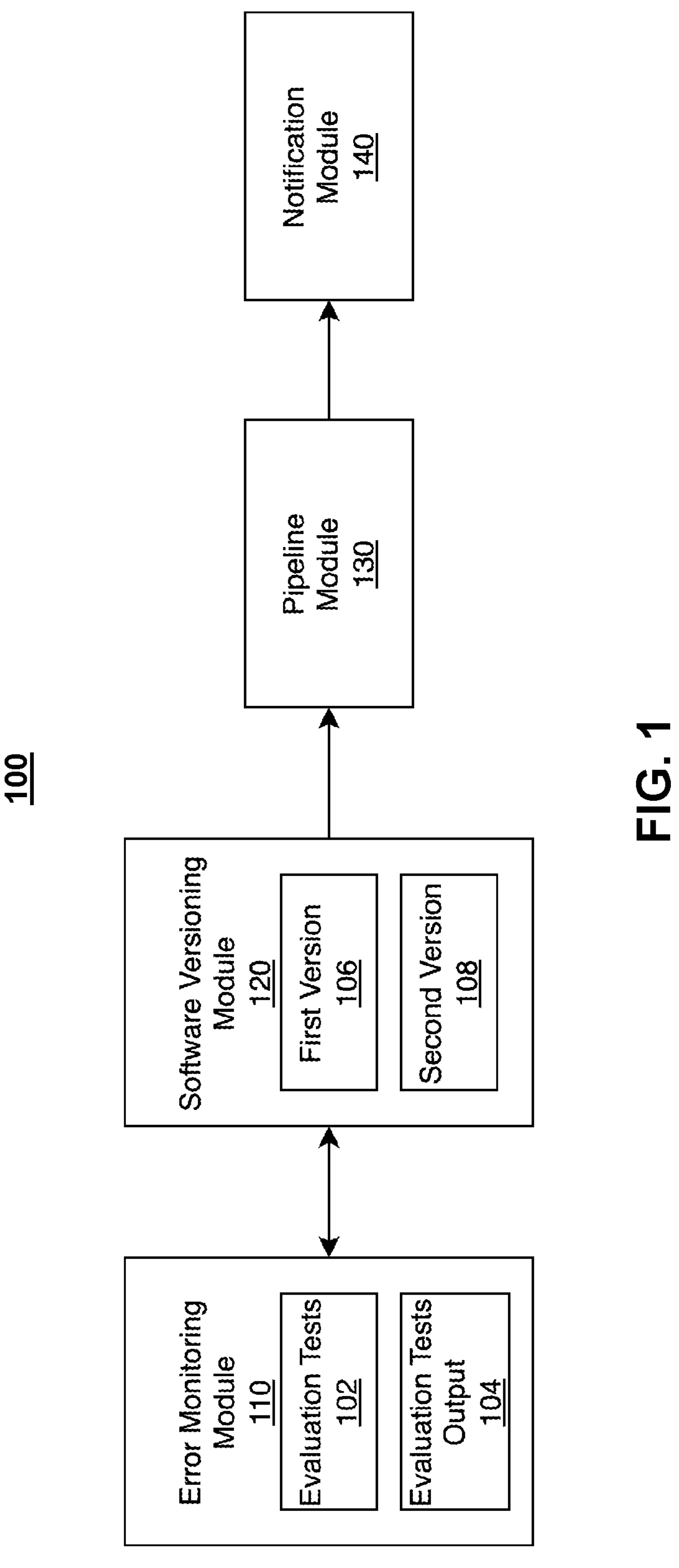
FIG. 1 shows an illustrative diagram of system components used for real-time error mitigation in a software pipeline, in accordance with one or more embodiments.

FIG. 1 shows an illustrative diagram of system components used for real-time error mitigation in a software pipeline, in accordance with one or more embodiments. The system 100 includes error monitoring module 110, software versioning module 120, pipeline module 130, and notification module 140. For example, the system may minimize negative consequences, in the form of coding errors or software vulnerabilities, to a current version of software in a pipeline. The system may receive a request for evaluating a pipeline at a recurrent interval of time. For example, the system may receive, from a server, a request for evaluating a pipeline at a recurrent interval of time. The request may include a first or previous version of software (e.g., first version 106), a second or current version of software (e.g., second version 108), one or more evaluation tests (e.g., evaluation tests 102) to execute on the second version of the software at intermittent intervals, and the recurrent interval of time. For example, the system may get a request to evaluate a pipeline every 15 minutes, 1 hour, 2 hours, 3 hours, or another suitable interval. The request provided to the system may include a previous version of a software (e.g., first version 106) and a current version of the software (e.g., second version 108) as well as corresponding tests to execute as part of the evaluation. By receiving a request for evaluating a pipeline at a recurrent interval of time, the system can instruct error monitoring module 110 to ensure that a pipeline is monitored consistently and any errors in releases are resolved quickly. For example, if any previous version is released over a current version, or if a current version has an error and needs to revert to the previous version, such issues are resolved quickly.

The system may execute evaluation tests (e.g., evaluation tests 102) on the second version of the software. For example, the system, in response to determining the recurrent interval of time elapsed, executes the one or more evaluation tests, by performing the one or more evaluation tests on the second version of the software. For example, if the interval of time is 3 hours, after 3 hours elapses the system performs evaluation tests on the current version of the software. After 3 hours elapses since the last evaluation tests were performed, the system may perform evaluation tests again.

In some embodiments, a user may provide attributes for the evaluation tests. For example, the system may determine the one or more evaluation tests to execute on the second version of the software at the intermittent intervals by receiving a user input, including attributes of the one or more evaluation tests, wherein the attributes describe components of a software to evaluate. For example, a user may provide a set of test cases to use to evaluate the software. The test cases provided by the user may be designed to test for the presence of specific vulnerabilities in the software (e.g., SQL injection or unauthorized access). By receiving attributes for evaluation tests from a user, the system can dynamically test the current version to ensure vulnerabilities are minimized.

In some embodiments, the system may determine evaluation tests by comparing attributes. For example, the system may determine the one or more evaluation tests to execute on the second version of the software at intermittent intervals, by accessing, from a remote server, a plurality of evaluation tests based on attributes of the one or more evaluation tests, wherein the attributes describe components of a software to evaluate, and identifying the one or more evaluation tests based on the attributes of the second version of the software. For example, the system may determine the evaluation tests by identifying evaluation tests to test a specific component of the software, such as unauthorized access, input errors or processing errors. By determining evaluation tests by comparing attributes, the system can provide a comprehensive check for the current version of the software, thereby limiting the risk of allowing the pipeline to host software with an error or vulnerability.

In some embodiments, evaluation tests are API calls. For example, the attributes of the one or more evaluation tests can comprise API calls, wherein the API calls are the attributes of specific functions in the software. For example, the system can perform a variety of API calls as part of the one or more evaluation tests. Using API calls is especially useful to ensure that errors in the current version of the software are not propagated to other systems that have software that integrates one or more portions of the current version of the software. By using API calls as part of the evaluation tests, the system can improve the security for other pieces of software that rely on the current version of the software in the pipeline.

In some embodiments, the evaluation tests can include sensor data. For example, the attributes of the one or more evaluation tests comprise sensor data, wherein the sensor data is included in the attributes of specific functions in the software. For example, the system can simulate unexpected values in sensor data. Specifically, the system can simulate sensor values that would indicate the sensor is broken (e.g., a thermometer in a hot climate displaying an excessively low temperature). A broken sensor or unexpected value could lead to further computational errors in the current version of the software. By including sensor data, the system can mitigate the negative consequences of failing to assess sensor data input or processes within the current version of the software in the pipeline.

In some embodiments, the evaluation tests can comprise user input. For example, the attributes of the one or more evaluation tests can comprise user input, wherein the user input is included in the attributes of specific functions in the software. For example, the evaluation tests can be used to simulate unexpected user input or improper user input. This can be especially useful in uncovering injection attacks. By simulating user input in the evaluation test, the system can mitigate the negative consequences of allowing errors in user input fields in the current version of the software.

The system may receive an output, e.g., evaluation tests output 104, from the evaluation tests, e.g., evaluation tests 102. For example, the system may receive an output of the one or more evaluation tests on the second version of the software. For example, the system may perform evaluation tests on the second version of the software, such as boundary testing. For example, if the system performs a boundary test to determine how the software handles edge cases, the system may receive, as output from the evaluation tests, an error message if the edge case was not handled in an appropriate manner. As another example, the system may perform stress testing as an evaluation test. The stress test may include generating higher than normal inputs to the software (e.g., multiple form entries in a short duration, or multiple web requests in a short duration) within a predefined duration.

Figure 2:
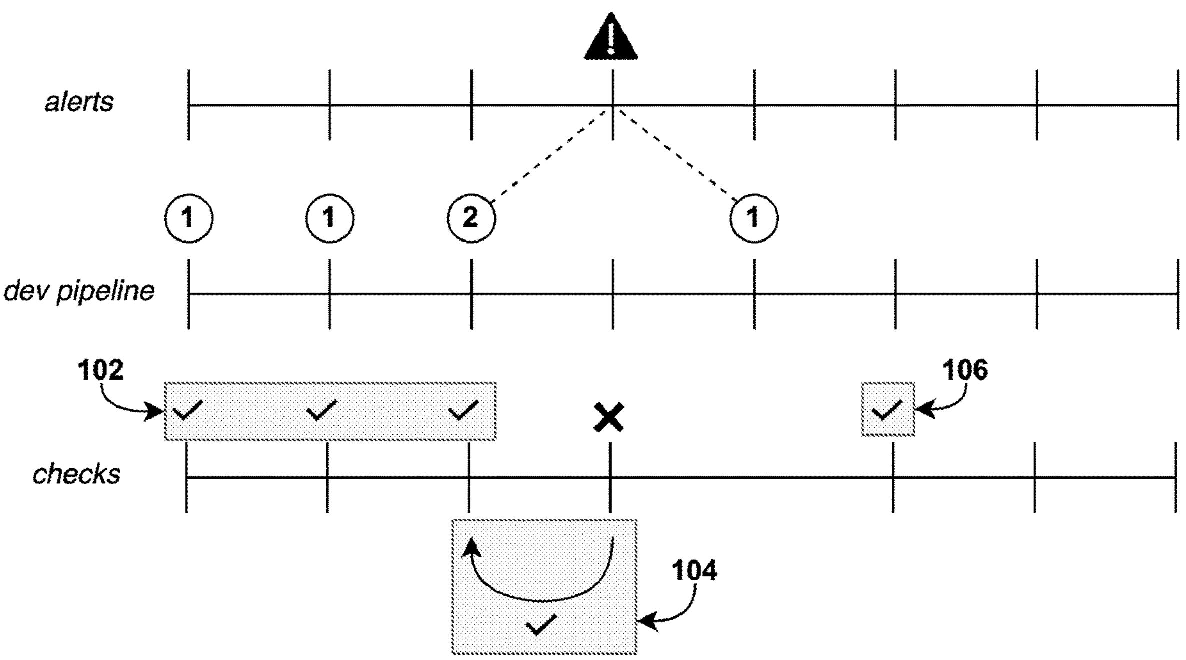
FIG. 2 shows an illustrative diagram for real-time error mitigation in a software pipeline, in accordance with one or more embodiments.

The system may determine that the output does not match target values. For example, as shown in FIG. 2, the system 200 determines the output 104 of the one or more evaluation tests 102 does not match one or more target values after the second version of the software is deployed. For example, the system may determine the software is producing unexpected or incorrect output by comparing the output of the evaluation test to known target values. Mismatched values for the output and expected output can indicate to the system the presence of an error or vulnerability of the current software version. By determining the output does not match target values, the system can increase the chance that the system identifies current versions of the software in the pipeline that contain errors or vulnerabilities.

The system may instruct software versioning module 120 to terminate the deployment of the second version. For example, the system may terminate the deployment of second version 108. For example, if the evaluation tests fail, it is evident that the second version of the software should not be released. As such, the system can terminate the deployment of the second version of the software to mitigate any consequences of maintaining the second version of the software over the first version (e.g., bugs or vulnerabilities in the code associated with the second version). By terminating the deployment of the second version of the software, the system can minimize the risk associated with having vulnerabilities or errors in a current version of the software.

The system may generate instructions to replace the second version, e.g., second version 108, with the first version, e.g., first version 106. For example, the system generates instructions to replace the second version of the software with the first version of the software. For example, the system may create instructions to revert to the first version, effectively replacing the second version of the software with the first version. In the case that the second version of the software is an updated form of the first version and in the case that the second version has errors, bugs, or vulnerabilities exposed by the execution and analysis of the evaluation tests, the system can revert to a previous version. Reverting to a previous version of the software mitigates many of the negative consequences of maintaining a version of the software with critical errors, bugs, or vulnerabilities.

In some embodiments, the system instructions may be executed by pipeline module 130 to replace the current version of the software with the previous version. For example, the system can replace the current version of the software with the previous version of the software based on the instructions, by removing code associated with the current version of the software from the software pipeline, generating a new version of the software based on the previous version of the software, and adding the new version of the software to the software pipeline. For example, in the event that a rollback is necessary, the system can generate a version of the software based on the previous version of the software and add the newly created version of the software to the software pipeline. By replacing the current version of the software with the previous version, the system can mitigate the negative consequences of allowing a pipeline to have a version of the software with errors or vulnerabilities.

In some embodiments, the system performs a post-rollback check. For example, after adding code associated with the previous version of the software to the software pipeline, the system receives a second output of the one or more evaluation tests on the new version of the software, determines the second output of the one or more evaluation tests does not match the one or more target values associated with the new version of the software, and transmits a second notification to the remote device. For example, the system can perform a second check on the new version of the previous software is added to the pipeline. If the system detects any discrepancies between the output of the evaluation tests performed on the new version of the software and the target values, the system can send a notification to the remote device for further investigation. By performing a post-rollback check, the system can ensure that additional errors or vulnerabilities were not introduced when the new version of the software was added to the pipeline. Furthermore, the system can notify the appropriate parties (e.g., parties associated with the remote device) to ensure that proper mitigating actions are taken.

In some embodiments, the system performs the evaluation test on two versions of the software. For example, the system can execute the one or more evaluation tests, by inputting, to the one or more evaluation tests, the second version of the software, generating a second output based on the one or more evaluation tests, and generating a second notification to the remote device based on the second output. For example, the system can use the evaluation tests to evaluate the second version of the software, and if the second version of the software contains the same errors or vulnerabilities as the first version of the software, another notification can be sent to the remote device. A vulnerability may extend past the last two to three software iterations if the second version of the software has the same errors as the first version of the software. In such an instance, the system can generate a notification to send to a remote device controlled by a system analyst that can investigate the error or vulnerability in greater depth. By performing the evaluation tests on two versions of the software, the system can increase the chance of identifying persistent errors or vulnerabilities in the software.

The system may instruct notification module 140 to transmit a notification. For example, the system may transmit a notification to a remote device. For example, the system may send a push notification to a mobile device or desktop computer used by a security analyst or software professional who is qualified to review and either accept or reject the actions performed by the system. By transmitting a notification of the system's actions, the system can inform a security analyst or software professional that actions were taken to prevent negative consequences by maintaining a version of the software (e.g., the second version) that did not pass the evaluation tests.

Figure 3:
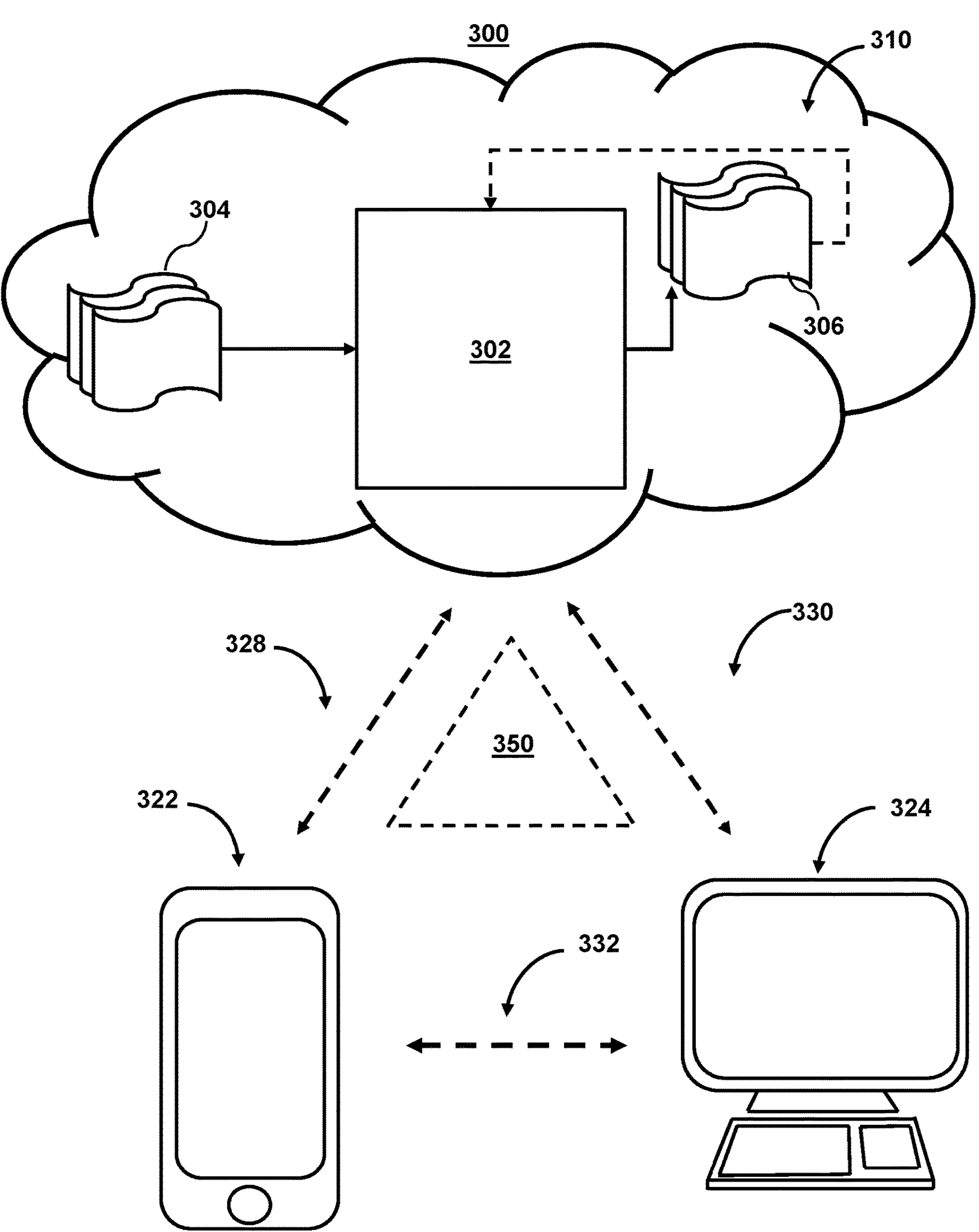
FIG. 3 shows illustrative components for a system used for real-time error mitigation in a software pipeline, in accordance with one or more embodiments.

FIG. 3 shows illustrative components for a system used for real-time error mitigation in a software pipeline, in accordance with one or more embodiments. For example, FIG. 3 may show illustrative components for minimizing negative consequences, in the form of coding errors or software vulnerabilities, to a current version of software in a pipeline. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphone and personal computer, respectively, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include one or more of error monitoring module 110, software versioning module 120, pipeline module 130, or notification module 140.

Cloud components 310 may include model 302, which may be a machine learning model, artificial intelligence model, etc. (which may be referred collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., coding errors or software vulnerabilities in a current version of software in a pipeline).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., coding errors or software vulnerabilities in a current version of software in a pipeline).

In some embodiments, the model (e.g., model 302) may automatically perform actions based on outputs 306. In some embodiments, the model (e.g., model 302) may not perform any actions. The output of the model (e.g., model 302) may be used for real-time error mitigation in the software pipeline.

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDOS protection, and API layer 350 may use RESTful APIs as standard for external integration.

Figure 4:
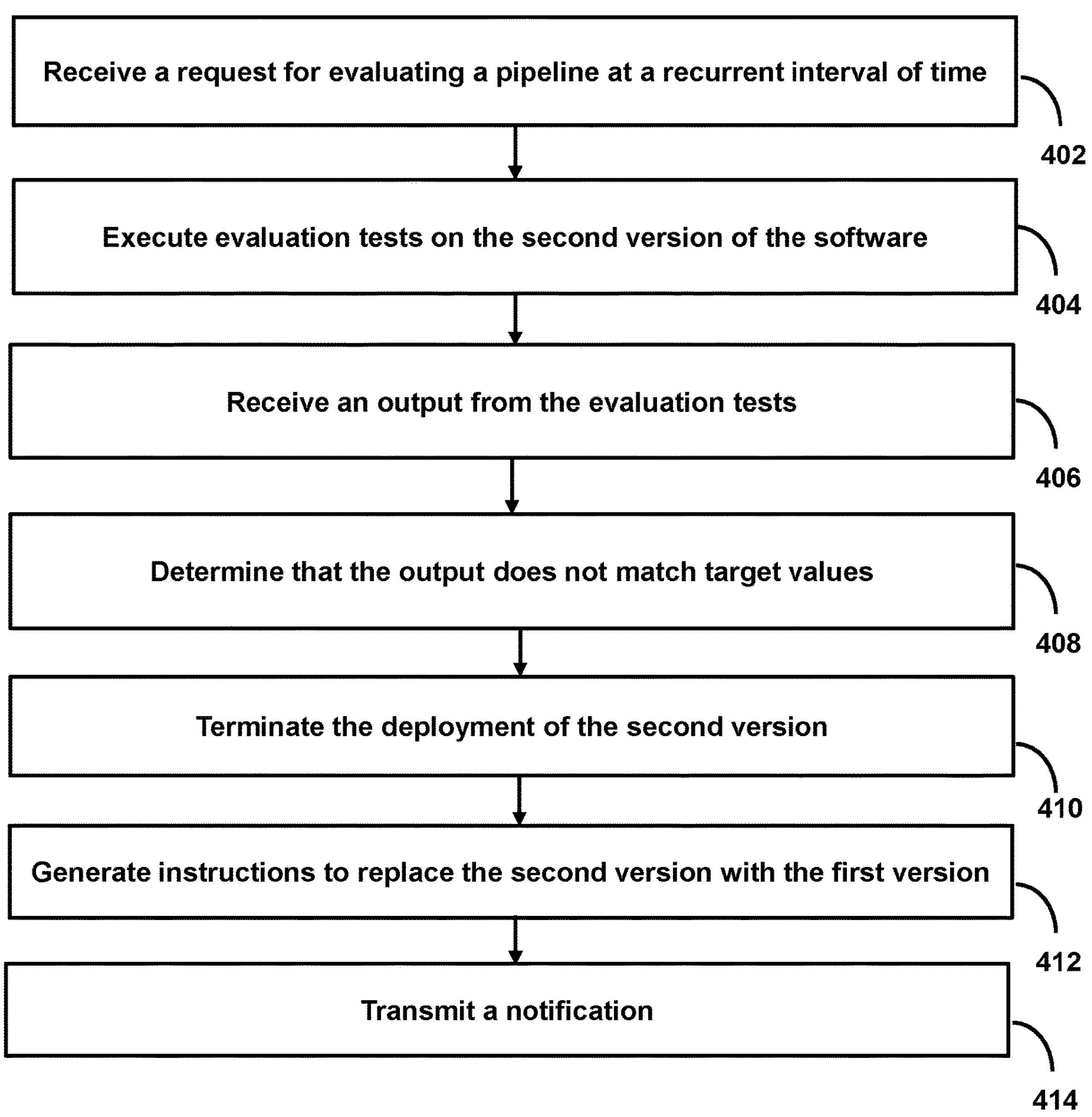
FIG. 4 shows a flowchart of the steps involved in comprehensively analyzing transactions to identify errors and vulnerabilities in a software development pipeline.

FIG. 4 shows a flowchart of the steps involved in comprehensively analyzing transactions to identify errors and vulnerabilities in a software development pipeline, in accordance with one or more embodiments. For example, the system may use process 400 (e.g., as implemented on one or more system components described above) in order to minimize negative consequences, in the form of coding errors or software vulnerabilities, to a current version of software in a pipeline.

At step 402, process 400 (e.g., using one or more components described above) receives a request for evaluating a pipeline at a recurrent interval of time. For example, the system may receive, from a server, a request for evaluating a pipeline at a recurrent interval of time, wherein the request comprises a first version of software, a second version of software, one or more evaluation tests to execute on the second version of the software at intermittent intervals, and the recurrent interval of time. For example, the system may get a request to evaluate a pipeline every 3 hours. The request provided to the system may include a previous version of a software and a current version of the software as well as corresponding tests to execute as part of the evaluation. By receiving a request for evaluating a pipeline at a recurrent interval of time, the system can ensure that a pipeline is monitored consistently and any errors in releases are resolved quickly. For example, if any previous version is released over a current version, or if a current version has an error and needs to revert to the previous version, such issues are resolved quickly.

At step 404, process 400 (e.g., using one or more components described above) executes evaluation tests on the second version of the software. For example, the system, in response to determining the recurrent interval of time elapsed, executes the one or more evaluation tests, by performing the one or more evaluation tests on the second version of the software. For example, if the interval of time is 3 hours, after 3 hours elapses the system performs evaluation tests on the current version of the software. After 3 hours elapses since the last evaluation tests were performed, the system may perform evaluation tests again.

In some embodiments, a user may provide attributes for the evaluation tests. For example, the system may determine the one or more evaluation tests to execute on the second version of the software at the intermittent intervals by receiving a user input, including attributes of the one or more evaluation tests, wherein the attributes describe components of a software to evaluate. For example, a user may provide a set of test cases to use to evaluate the software. The test cases provided by the user may be designed to test for the presence of specific vulnerabilities in the software (e.g., SQL injection or unauthorized access). By receiving attributes for evaluation tests from a user, the system can dynamically test the current version to ensure vulnerabilities are minimized.

In some embodiments, the system may determine evaluation tests by comparing attributes. For example, the system may determine the one or more evaluation tests to execute on the second version of the software at intermittent intervals, by accessing, from a remote server, a plurality of evaluation tests based on attributes of the one or more evaluation tests, wherein the attributes describe components of a software to evaluate, and identifying the one or more evaluation tests based on the attributes of the second version of the software. For example, the system may determine the evaluation tests by identifying evaluation tests to test a specific component of the software, such as unauthorized access, input errors or processing errors. By determining evaluation tests by comparing attributes, the system can provide a comprehensive check for the current version of the software, thereby limiting the risk of allowing the pipeline to host software with an error or vulnerability.

At step 406, process 400 (e.g., using one or more components described above) receives an output from the evaluation tests. For example, the system receives an output of the one or more evaluation tests on the second version of the software. For example, the system may perform evaluation tests on the second version of the software, such as boundary testing. For example, if the system performs a boundary test to determine how the software handles edge cases, the system may receive, as output from the evaluation tests, an error message if the edge case was not handled in an appropriate manner. As another example, the system may perform stress testing as an evaluation test. The stress test may include generating higher than normal inputs to the software (e.g., multiple form entries in a short duration, or multiple web requests in a short duration) within a predefined duration.

At step 408, process 400 (e.g., using one or more components described above) determines that the output does not match target values. For example, the system determines the output of the one or more evaluation tests does not match one or more target values. For example, the system may determine the software is producing unexpected or incorrect output by comparing the output of the evaluation test to known target values. Mismatched values for the output and expected output can indicate to the system the presence of an error or vulnerability of the current software version. By determining the output does not match target values, the system can increase the chance that the system identifies current versions of the software in the pipeline that contain errors or vulnerabilities.

At step 410, process 400 (e.g., using one or more components described above) terminates the deployment of the second version. For example, the system may terminate the deployment of the second version of the software. For example, if the evaluation tests fail, it is evident that the second version of the software should not be released. As such, the system can terminate the deployment of the second version of the software to mitigate any consequences of maintaining the second version of the software over the first version (e.g., bugs or vulnerabilities in the code associated with the second version). By terminating the deployment of the second version of the software, the system can minimize the risk associated with having vulnerabilities or errors in a current version of the software.

At step 412, process 400 (e.g., using one or more components described above) generates instructions to replace the second version with the first version. For example, the system generates instructions to replace the second version of the software with the first version of the software. For example, the system may create instructions to revert to the first version, effectively replacing the second version of the software with the first version. In the case that the second version of the software is an updated form of the first version and in the case that the second version has errors, bugs, or vulnerabilities exposed by the execution and analysis of the evaluation tests, the system can revert to a previous version. Reverting to a previous version of the software mitigates many of the negative consequences of maintaining a version of the software with critical errors, bugs, or vulnerabilities.

In some embodiments, the system replaces the current version of the software with the previous version. For example, the system can replace the current version of the software with the previous version of the software based on the instructions, by removing code associated with the current version of the software from the software pipeline, generating a new version of the software based on the previous version of the software, and adding the new version of the software to the software pipeline. For example, in the event that a rollback is necessary, the system can generate a version of the software based on the previous version of the software and add the newly created version of the software to the software pipeline. By replacing the current version of the software with the previous version, the system can mitigate the negative consequences of allowing a pipeline to have a version of the software with errors or vulnerabilities.

In some embodiments, the system performs a post-rollback check. For example, after adding code associated with the previous version of the software to the software pipeline, the system receives a second output of the one or more evaluation tests on the new version of the software, determines the second output of the one or more evaluation tests does not match the one or more target values associated with the new version of the software, and transmits a second notification to the remote device. For example, the system can perform a second check on the new version of the previous software is added to the pipeline. If the system detects any discrepancies between the output of the evaluation tests performed on the new version of the software and the target values, the system can send a notification to the remote device for further investigation. By performing a post-rollback check, the system can ensure that additional errors or vulnerabilities were not introduced when the new version of the software was added to the pipeline. Furthermore, the system can notify the appropriate parties (e.g., parties associated with the remote device) to ensure that proper mitigating actions are taken.

In some embodiments, evaluation tests are API calls. For example, the attributes of the one or more evaluation tests can comprise API calls, wherein the API calls are the attributes of specific functions in the software. For example, the system can perform a variety of API calls as part of the one or more evaluation tests. Using API calls is especially useful to ensure that errors in the current version of the software are not propagated to other systems that have software that integrates one or more portions of the current version of the software. By using API calls as part of the evaluation tests, the system can improve the security for other pieces of software that rely on the current version of the software in the pipeline.

In some embodiments, the evaluation tests can include sensor data. For example, the attributes of the one or more evaluation tests comprise sensor data, wherein the sensor data is included in the attributes of specific functions in the software. For example, the system can simulate unexpected values in sensor data. Specifically, the system can simulate sensor values that would indicate the sensor is broken (e.g., a thermometer in a hot climate displaying an excessively low temperature). A broken sensor or unexpected value could lead to further computational errors in the current version of the software. By including sensor data, the system can mitigate the negative consequences of failing to assess sensor data input or processes within the current version of the software in the pipeline.

In some embodiments, the evaluation tests can comprise user input. For example, the attributes of the one or more evaluation tests can comprise user input, wherein the user input is included in the attributes of specific functions in the software. For example, the evaluation tests can be used to simulate unexpected user input or improper user input. This can be especially useful in uncovering injection attacks. By simulating user input in the evaluation test, the system can mitigate the negative consequences of allowing errors in user input fields in the current version of the software.

In some embodiments, the system performs the evaluation test on two versions of the software. For example, the system can execute the one or more evaluation tests, by inputting, to the one or more evaluation tests, the second version of the software, generating a second output based on the one or more evaluation tests, and generating a second notification to the remote device based on the second output. For example, the system can use the evaluation tests to evaluate the second version of the software, and if the second version of the software contains the same errors or vulnerabilities as the first version of the software, another notification can be sent to the remote device. A vulnerability may extend past the last two to three software iterations if the second version of the software has the same errors as the first version of the software. In such an instance, the system can generate a notification to send to a remote device controlled by a system analyst that can investigate the error or vulnerability in greater depth. By performing the evaluation tests on two versions of the software, the system can increase the chance of identifying persistent errors or vulnerabilities in the software.

At step 414, process 400 (e.g., using one or more components described above) transmits a notification. For example, the system may transmit a notification to a remote device. For example, the system may send a push notification to a mobile device or desktop computer used by a security analyst or software professional who is qualified to review and either accept or reject the actions performed by the system. By transmitting a notification of the system's actions, the system can inform a security analyst or software professional that actions were taken to prevent negative consequences by maintaining a version of the software (e.g., the second version) that did not pass the evaluation tests.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real-time. It should also be noted that the systems and/or methods described above may be applied to, or used in accordance with, other systems and/or methods.

The present techniques will be better understood with reference to the following enumerated embodiments:

1. A method, the method comprising receiving, from a server, a request for evaluating a software pipeline at a recurrent interval of time, wherein the request comprises a previous version of software, a current version of software, and the recurrent interval of time; based on the request, determining one or more evaluation tests to execute on the current version of the software at the recurrent interval of time; in response to determining an instance of the recurrent interval of time has elapsed, executing the one or more evaluation tests on the current version of the software; receiving an output of the one or more evaluation tests on the current version of the software; determining whether the output of the one or more evaluation tests does not match one or more target values; in response to determining that the output of the one or more evaluation tests does not match one or more target values: terminating deployment of the current version of the software; generating instructions to replace the current version of the software with the previous version of the software; and transmitting a notification to a remote device indicating a real-time error mitigation action has occurred.

2. A method, the method comprising: receiving, from a server, a request for evaluating a pipeline at a recurrent interval of time, wherein the request comprises a first version of software, a second version of software, one or more evaluation tests to execute on the second version of the software at intermittent intervals, and the recurrent interval of time; in response to determining the recurrent interval of time elapsed, executing the one or more evaluation tests, by performing the one or more evaluation tests on the second version of the software; receiving an output of the one or more evaluation tests on the second version of the software; determining the output of the one or more evaluation tests does not match one or more target values; terminating deployment of the second version of the software; generating instructions to replace the second version of the software with the first version of the software; and transmitting a notification to a remote device.

3. A method, the method comprising: receiving, from a server, a request for evaluating a pipeline at a recurrent interval of time, wherein the request comprises a previous version of software, a current version of software, one or more evaluation tests to execute on the current version of the software at intermittent intervals, and the recurrent interval of time; receiving an output of the one or more evaluation tests on the current version of the software, wherein the one or more evaluation tests are conducted on the current version of the software; determining the output of the one or more evaluation tests does not match one or more target values; terminating deployment of the current version of the software; generating instructions to replace the current version of the software with the previous version of the software; and transmitting a notification to a remote device.

4. The method of any one of the preceding embodiments, wherein the system replaces the current version of the software with the previous version of the software based on the instructions, by: removing code associated with the current version of the software from the software pipeline; generating a replacement version of the software based on the previous version of the software; and adding the replacement version of the software to the software pipeline.

5. The method of any one of the preceding embodiments, further comprising: performing a check after adding code associated with the previous version of the software to the software pipeline, by: receiving a second output of the one or more evaluation tests on the replacement version of the software; determining that the second output of the one or more evaluation tests does not match the one or more target values associated with the replacement version of the software; and transmitting a second notification to the remote device indicating the real-time error mitigation action was unsuccessful; and in response to determining that the second output of the one or more evaluation tests does not match the one or more target values associated with the replacement version of the software: terminating deployment of the replacement version of the software; generating instructions to revert from the replacement version of the software to the current version of the software; and transmitting a third notification to the remote device indicating the real-time error mitigation action has been reversed.

6. The method of any one of the preceding embodiments, further comprising performing a check after adding code associated with the first version of the software to the pipeline, by: receiving a second output of the one or more evaluation tests on the new version of the software; determining the second output of the one or more evaluation tests does not match the one or more target values associated with the new version of the software; and transmitting a second notification to the remote device.

7. The method of any one of the preceding embodiments, further comprising determining the one or more evaluation tests to execute on the second version of the software at the intermittent intervals, comprising: receiving a user input including attributes of the one or more evaluation tests, wherein the attributes describe components of a software to evaluate.

8. The method of any one of the preceding embodiments, further comprising determining the one or more evaluation tests to execute on the second version of the software at intermittent intervals, comprising: accessing, from a remote server, a plurality of evaluation tests based on attributes of the one or more evaluation tests, wherein the attributes describe components of a software to evaluate; and identifying the one or more evaluation tests based on the attributes of the second version of the software.

9. The method of any one of the preceding embodiments, wherein the attributes of the one or more evaluation tests comprise API calls, wherein the API calls are the attributes of specific functions in the software.

10. The method of any one of the preceding embodiments, wherein the attributes of the one or more evaluation tests comprise sensor data, wherein the sensor data is included in the attributes of specific functions in the software.

11. The method of any one of the preceding embodiments, wherein the attributes of the one or more evaluation tests comprise user input, wherein the user input is included in the attributes of specific functions in the software.

12. The method of any one of the preceding embodiments, wherein executing the one or more evaluation tests further comprises: inputting, to the one or more evaluation tests, the second version of the software; generating a second output based on the one or more evaluation tests; and generating a second notification to the remote device based on the second output.

13. The method of any one of the preceding embodiments, wherein generating the second output based on the one or more evaluation tests further comprises: inputting, to the one or more evaluation tests, the second version of the software; receiving the second output based on the one or more evaluation tests; and generating the second notification to the remote device based on the second output.

14. One or more tangible, non-transitory, computer-readable media storing instructions that, when executed by a data processing apparatus, cause the data processing apparatus to perform operations comprising those of any of embodiments 1-13.

15. A system comprising one or more processors; and memory storing instructions that, when executed by the processors, cause the processors to effectuate operations comprising those of any of embodiments 1-13.

16. A system comprising means for performing any of embodiments 1-13.

What is claimed is:

1. A system for real-time error mitigation in a software pipeline, the system comprising:

one or more processors; and one or more non-transitory computer-readable media having instructions recorded thereon that, when executed by the one or more processors, cause operations comprising:

receiving, from a server, a request for evaluating a software pipeline at a recurrent interval of time, wherein the request comprises a previous version of software, a current version of software, and the recurrent interval of time;

based on the request, determining one or more evaluation tests to execute on the current version of the software at the recurrent interval of time;

in response to determining an instance of the recurrent interval of time has elapsed, executing the one or more evaluation tests on the current version of the software;

receiving an output of the one or more evaluation tests on the current version of the software;

determining that the output of the one or more evaluation tests does not match one or more target values;

in response to determining that the output of the one or more evaluation tests does not match one or more target values:

terminating deployment of the current version of the software;

generating a replacement version of the software based on the previous version of the software;

adding the replacement version of the software to the software pipeline;

receiving a second output of the one or more evaluation tests on the replacement version of the software;

determining that the second output of the one or more evaluation tests does not match the one or more target values; and generating, based on determining that the second output of the one or more evaluation tests does not match the one or more target values, instructions to revert from the replacement version of the software to the current version of the software.

2. The system of claim 1, wherein the operations further comprise:

removing code associated with the current version of the software from the software pipeline.

3. The system of claim 1, wherein the operations further comprise:

in response to determining that the second output of the one or more evaluation tests does not match the one or more target values associated with the replacement version of the software:

terminating deployment of the replacement version of the software; and transmitting a notification indicating that a real-time error mitigation action has been reversed.

4. A method for real-time error mitigation in a pipeline, the method comprising:

receiving, from a server, a request for evaluating a pipeline at a recurrent interval of time, wherein the request identifies software, one or more evaluation tests, and the recurrent interval of time;

receiving an output of the one or more evaluation tests on a first version of the software;

determining that the output of the one or more evaluation tests does not match one or more target values;

terminating deployment of the first version of the software;

deploying a second version of the software;

receiving a second output of the one or more evaluation tests on the second version of the software;

determining that the second output of the one or more evaluation tests does not match the one or more target values; and generating, based on determining that the second output of the one or more evaluation tests does not match the one or more target values, instructions to revert from the second version of the software.

5. The method of claim 4, further comprising:

removing code associated with the second version of the software from the pipeline.

6. The method of claim 4, further comprising:

determining the one or more evaluation tests to execute on the second version of the software; and receiving a user input including attributes of the one or more evaluation tests, wherein the attributes describe components of the software to evaluate.

7. The method of claim 4, further comprising:

accessing a plurality of evaluation tests based on attributes of the software; and identifying the one or more evaluation tests based on attributes of the second version of the software.

8. The method of claim 7, wherein the attributes of the software are API calls of specific functions in the software.

9. The method of claim 7, wherein the attributes of the software are sensor data included in attributes of specific functions in the software.

10. The method of claim 7, wherein the attributes of the software are user input included in attributes of specific functions in the software.

11. The method of claim 4, further comprises comprising:

inputting, to the one or more evaluation tests, the second version of the software before receiving the second output of the one or more evaluation tests.

12. The method of claim 4, wherein terminating the deployment of the first version of the software comprises:

terminating, based on determining that the output of the one or more evaluation tests does not match one or more target values, deployment of the first version of the software.

13. The method of claim 4, wherein the first version of the software is a current version of the software, wherein the second version of the software is a replacement version of the software, and wherein the method further comprises:

generating, based on determining that the output of the one or more evaluation tests does not match one or more target values, the replacement version of the software based on a previous version of the software.

14. The method of claim 4, further comprising:

wherein the first version of the software is a current version of the software, and wherein the second version of the software is a replacement version of the software.

15. One or more non-transitory, computer-readable media storing instructions that, when executed by one or more processors, cause operations comprising:

receiving, from a server, a request for evaluating a pipeline at a recurrent interval of time, wherein the request identifies software, one or more evaluation tests;

receiving an output of the one or more evaluation tests on a current version of the software;

determining that the output of the one or more evaluation tests does not match one or more target values;

terminating deployment of the current version of the software;

deploying a replacement version of the software;

receiving a second output of the one or more evaluation tests on the replacement version of the software;

determining that the second output of the one or more evaluation tests does not match the one or more target values; and generating, based on determining that the second output of the one or more evaluation tests does not match the one or more target values, instructions to revert from the replacement version of the software to the current version of the software.

16. The one or more non-transitory, computer-readable media of claim 15, wherein the operations further comprise:

removing code associated with the current version of the software from the pipeline.

17. The one or more non-transitory, computer-readable media of claim 15, wherein the operations further comprise:

receiving a user input including attributes of the one or more evaluation tests.

18. The one or more non-transitory, computer-readable media of claim 15, wherein the operations further comprise:

identifying the one or more evaluation tests based on attributes of the current version of the software.

19. The one or more non-transitory, computer-readable media of claim 17, wherein the attributes of the one or more evaluation tests comprise API calls.

20. The one or more non-transitory, computer-readable media of claim 17, wherein the attributes of the one or more evaluation tests comprise sensor data.

* * * * *